United States Patent [19]

Arnaud et al.

[11] 4,352,778
[45] Oct. 5, 1982

[54] DEVICE FOR HOLDING AND SUPPLYING WITH LIQUID METAL AN ASSEMBLY FOR A NUCLEAR REACTOR CORE

[75] Inventors: Georges Arnaud, Manosque; Gerard Chiarelli, Aix en Provence, both of France

[73] Assignee: Commissariat a l'Energie Atomique, Paris, France

[21] Appl. No.: 101,075

[22] Filed: Dec. 7, 1979

[30] Foreign Application Priority Data

Dec. 14, 1978 [FR] France ................. 78 35201

[51] Int. Cl.³ ............................. G21C 3/14
[52] U.S. Cl. ................. 376/365; 376/459; 376/352; 376/203
[58] Field of Search ............ 176/50, 61, 78, 84; 376/365, 352, 203

[56] References Cited

U.S. PATENT DOCUMENTS

| 3,087,881 | 4/1963 | Treshow | 176/61 |
| 3,383,287 | 5/1968 | Jackson | 176/50 |
| 3,501,377 | 3/1970 | Germer | 176/50 |
| 3,619,367 | 11/1971 | Gumuchian | 176/61 |
| 3,666,624 | 5/1972 | Finch et al. | 176/50 |
| 3,763,886 | 10/1973 | Lambert | 176/61 |
| 3,888,731 | 6/1975 | Finch et al. | 176/50 |
| 4,053,358 | 10/1977 | Pennell | 176/50 |
| 4,053,359 | 10/1977 | Pennell et al. | 176/50 |

FOREIGN PATENT DOCUMENTS

| 248407 | 12/1960 | Australia | 176/84 |
| 2005868 | 8/1971 | Fed. Rep. of Germany | 176/61 |
| 2245955 | 3/1973 | Fed. Rep. of Germany | 176/61 |
| 51-99798 | 9/1976 | Japan | 176/61 |

Primary Examiner—Harvey E. Behrend

[57] ABSTRACT

The fuel assembly is supported by means of a cylindrical supporting member which is introduced into a shore of the cross-member. The foot of the fuel assembly is introduced into the upper part of the cross-member. Orifices, coinciding with those made with the shore permit the introduction of the liquid metal into the supporting member and from there into the actual assembly. The supporting member is closed at its lower end.

Application to the construction of the core of a fast neutron nuclear cooled with liquid sodium.

6 Claims, 4 Drawing Figures

DEVICE FOR HOLDING AND SUPPLYING WITH LIQUID METAL AN ASSEMBLY FOR A NUCLEAR REACTOR CORE

BACKGROUND OF THE INVENTION

The present invention relates to a device for holding and supplying with cooling liquid an assembly for a nuclear reactor.

More specifically, the present invention relates to a special arrangement which on the one hand ensures the maintaining in place of the assemblies forming the core of a fast neutron reactor and which on the other hand make it possible to adapt the cooling liquid flow rate passing through each assembly in order to extract the thermal calories given off by the latter.

It is known that in a nuclear reactor of this type, the core is conventionally supported by a rigid cross-member bearing against the base or ring member of a main vessel which surrounds the core and contains an appropriate volume of cooling liquid, generally sodium. The vessel may also contain, in the so-called integrated solution, heat exchangers and pumps which enable the sodium to be circulated through the core where it removes the calories given off by the fission reaction of the fuel material before restoring said calories to a secondary fluid in the heat exchangers, after which it is taken up by circulating pumps transferring it beneath the cross-member with a view to a further passage into the core. The assemblies constituted by the core are arranged vertically and each assembly comprises an elongated box open at its upper end and containing a group of sheathed fuel needles and provided at its lower end with a positioning leg. In conventional solutions, this leg serves for the fixing of the assembly on the cross-member and for regulating the flow rate of the sodium passing through the assembly.

It is also known that the core of a nuclear reactor has a central zone where the nuclear fuel within the needles of the assemblies is constituted by fissile material, said zone being completely surrounded laterally and from above and below by breeding blankets. Thus, each fuel assembly in the central zone has, in each needle, not only fissile material, but also fertile material. Moreover, the lateral blanket is constituted by assemblies similar to those of the central zone, but in which the groups of needles only contain fertile material. Finally, the latter blanket is itself surrounded by a lateral neutron protection having a plurality of concentric assembly rings which, unlike fissile or fertile fuel assemblies contains no nuclear material. These protective assemblies arranged on the core periphery have the function of preventing the activation of the secondary fluid traversing the exchangers and to minimise damage to the vessel containing the circulating liquid, sodium.

Moreover, other types of assemblies provided in the nuclear reactor core and arranged across the latter are provided and are in particular inserted in recesses made in the fuel assemblies, whereby by means of their elongated casings said assemblies constitute guidance sleeves for the regulating, control or security members necessary for the operation of the reactor. Moreover, the enrichment of the fissile material of the fuel assemblies varies according to their position in the reactor core.

It can be gathered from what has been stated hereinbefore that different types of assemblies are used in the nuclear reactor and at the regulation of the sodium flow traversing these assemblies must be adapted to their nature and their position within the reactor core.

French Pat. No. 75 20819, filed on July 2, 1975 by the present applicant relates to an assembly for a fast neutron reactor and more particularly the means for regulating the sodium flow through assembly base. In the attached FIG. 1 is shown the assembly described in said patent specification.

In FIG. 1, reference numeral 1 designates an assembly, more particularly suitable for installation in the core of a fast neutron nuclear reactor cooled by a liquid metal. This assembly has at its lower end a positioning leg, formed by a hollow cylindrical member 2, the latter being joined by a spherical bearing surface 3 to an open casing 4 arranged in the extension of the said leg. The upper end of casing 4 is terminated by a head 5, whose constructional details are unimportant with respect to the present invention. In its median part, member 2 has a zone 6 in which are provided oblong openings 7, regularly distributed about its axis, permitting the liquid cooling metal to circulate in the leg by entering the latter via these openings before flowing from bottom to top, firstly in member 2 and then in casing 4, before leaving the latter by its upper open head 5. At its lower end, member 2 is sealed by a plug 8, fixed to the leg by any appropriate means. According to a conventional arrangement, member 2 is maintained in its vertical position by engagement in a hollow shore 9, belonging to a supporting cross-member for the reactor core, diagrammatically indicated in the drawing by reference numeral 10. This shore has holes 11 located in its lateral surface to the right of opening 7 in member 2 in order to permit the liquid cooling metal delivered under pressure to cross-member 10 to enter the assembly and flow from bottom to top thereof. Member 2 rests on the upper part of shore 9 by its bearing surface 3, plug 8 engaging in a recess 8' provided on the base of the shore in the vicinity of the lower part of cross-member 10.

It is also pointed out that within leg 2 and above the oblong opening 7, the leg has on the inside diaphragms permitting the regulation of the sodium flow rate. Moreover, the inner plug 8 makes it possible to obviate errors in the fitting of the assembly due to its shape which cooperates with the shape of the recess 8'.

It can be gathered from the preceding description of the prior art that the sodium flow is regulated by arrangements forming an integral part of the actual assembly. Moreover, to ensure adequate operating conditions, the leg must have a considerable height. As a result, the weight of the fuel assembly and in particular the part of this weight due to the leg is high. However, these assemblies have to be manipulated during the loading and unloading operations of the nuclear reactor.

BRIEF SUMMARY OF THE INVENTION

The present invention relates to a device for holding and regulating the supply of liquid cooling metal to assemblies for fast neutron reactors, making it possible to significantly reduce the height and weight of said assemblies and which also separates the active part of the assembly from the mechanisms for regulating the flow of coolant having to pass through the same.

According to the invention, a supplementary detachable holding member is provided, being inserted into a shore fixed to the cross-member and in turn receiving the leg or face of the assembly, the latter having a reduced length. It is of particular importance to note that this supplementary member comprises all the mechanisms for regulating the flow rate of the coolant having to pass through the assembly which it has to support. In other words, the coolant flow regulating function is separated from the neutron function to be fulfilled by the assembly in question. Moreover, this holding member makes it possible by means of appropriate arrangements to ensure the hydraulic locking of the assembly within the cross-member, i.e. to prevent the "flying-off" thereof under the action of the upward circulation of the coolant through the assembly.

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENTS

In the following description, reference will only be made to the arrangements necessary for maintaining a fuel assembly on the cross-member and the regulation of the coolant flow rates, i.e. there will be no overall description of the assembly. Obviously, the following description applies to all types of assemblies, no matter whether they are fertile or of some other type.

Figure 2:
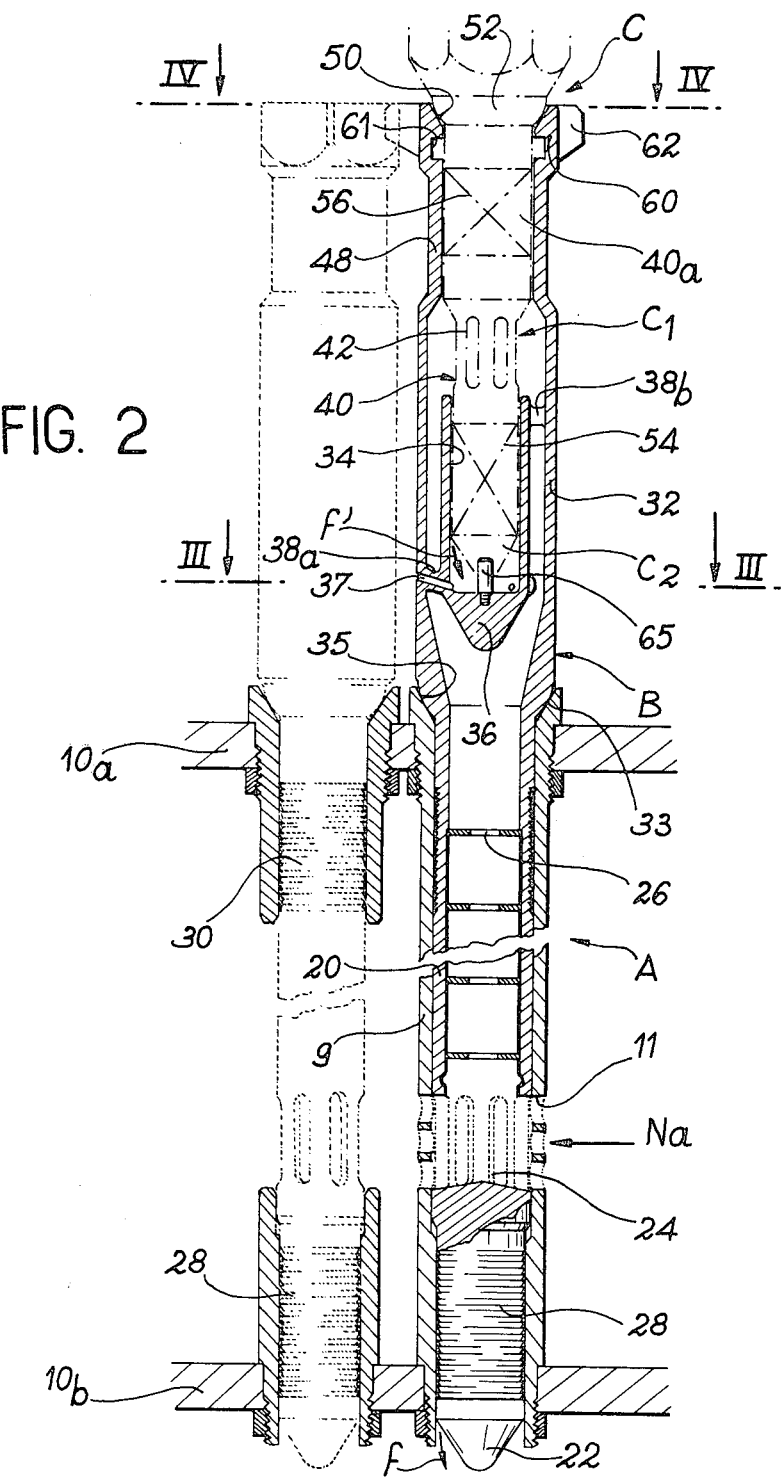
FIG. 2 a vertical sectional view of two fuel assemblies according to the invention.

FIG. 2 shows cross-member A, supporting member B and fuel assembly C with in particular its leg $C_1$. In general terms, it can be stated that according to the invention the supporting member B is introduced into the cross-member and carries the fuel assembly C by its leg $C_1$, whilst permitting the regulation of the sodium flow rate passing through the fuel assembly.

The different parts of the assembly will now be described in greater detail. Cross-member A comprises two substantially horizontal and parallel plates 10a, 10b in which are fixed the shores 9. The latter are provided with a series of openings 11 permitting the introduction into the assembly of a pressurized sodium flow from the cross-member. The lower part of the supporting member B comprises a cylindrical sleeve 20 sealed at its lower end by a frustum-shaped plug 22. Cylindrical body 20 has oblong openings 24 which are linked with the openings 11 made in the shores, when the supporting member B is fitted. In its part contained in the shore 9, cylindrical body 20 internally has diaphragms such as 26, permitting the regulation of the sodium flow within the supporting member and consequently within the fuel assembly. They are similar to those described in the above-mentioned French patent specification. It is clear that this lower part 20 of the supporting member B serves exactly the same function as the cylindrical member 2 of the leg of the assembly according to the prior art, but said part is not fixed to the actual assembly. The fitting between the shore 9 and the cylindrical body 20 is effected with a clearance, so that the limited sodium flow entering by means of openings 11 does not supply the oblong openings 24 of supporting member B. In order to limit this leakage flow, labyrinths 28 and 30 arranged on either side of oblong openings 24 are located on the outer face of body 20. Thus, in the lower part of shore 9, a low pressure liquid sodium leakage flow f is obtained, i.e. a very reduced pressure compared with the sodium intake pressure in supporting member B.

Figure 3:
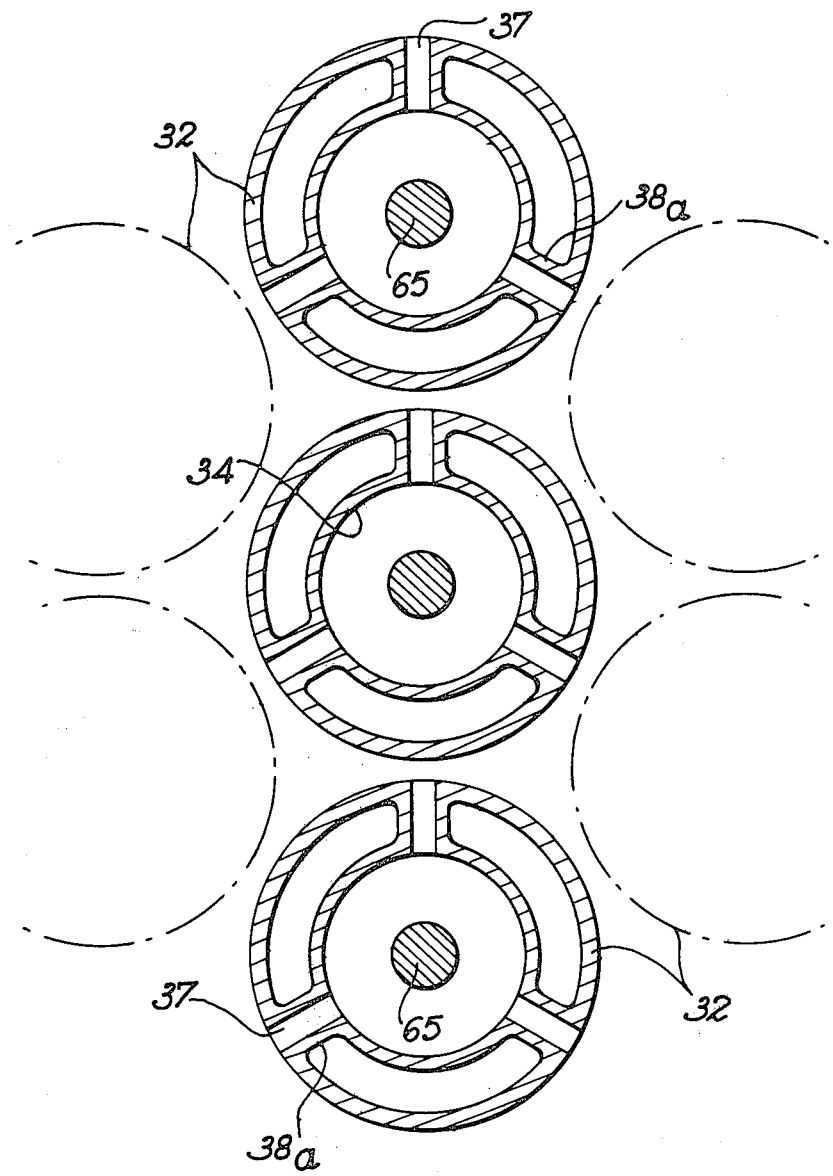
FIG. 3 a cross-sectional view in accordance with plane III—III of FIG. 2.

Above the cylindrical body 20 the supporting member B has an upper cylindrical part 32 connected to the cylindrical body 20 by a frustum-shaped bearing surface 33, which cooperates with a spherical bearing surface 35 made in the upper portion of shore 9 for supporting the supporting member B. This upper part 32 on the one hand supports the actual fuel assembly C and on the other supplies said assembly with coolant. To this end, the upper part 32 internally has a coaxial tube 34 sealed by a base 36. Tube 34 is joined to part 32 by two series of three spacers 120° from one another, 38a, 38b, which are suitably profiled so that they do not disturb the sodium flow, as shown in FIG. 3. Orifices such as 37 made in the spacers 38a permit the connection of the inside of tube 34 with the sodium located externally of supporting member B. The assembly leg $C_1$ also has a hollow member 40 with oblong openings 42, positioned above tube 34 when the fuel assembly is fitted. The upper part 32 has a reduced diameter portion 48 able to cooperate with the part 40a of the fuel assembly leg. In other words, the fuel assembly leg is introduced on the one hand into tube 34 and on the other into the reduced diameter portion 48 of upper part 32 of the supporting member. At the upper part of its upper part, the supporting member has a frustum-shaped bearing surface 50, which cooperates with a corresponding spherical bearing surface 52 in the actual fuel assembly. In order to limit the leakage flow between fuel assembly leg $C_1$ and the upper part 32 of supporting member B, two labyrinths 54 (within tube 34) and 56 (within the reduced diameter part 48) are also provided on the outer face of the fuel assembly leg. Thus, a limited sodium leakage flow f' is obtained, whose pressure is below that which is introduced into the actual fuel assembly. The reduced diameter part 48 facilitates the radial outflow of the leakage flow f'.

Figure 4:
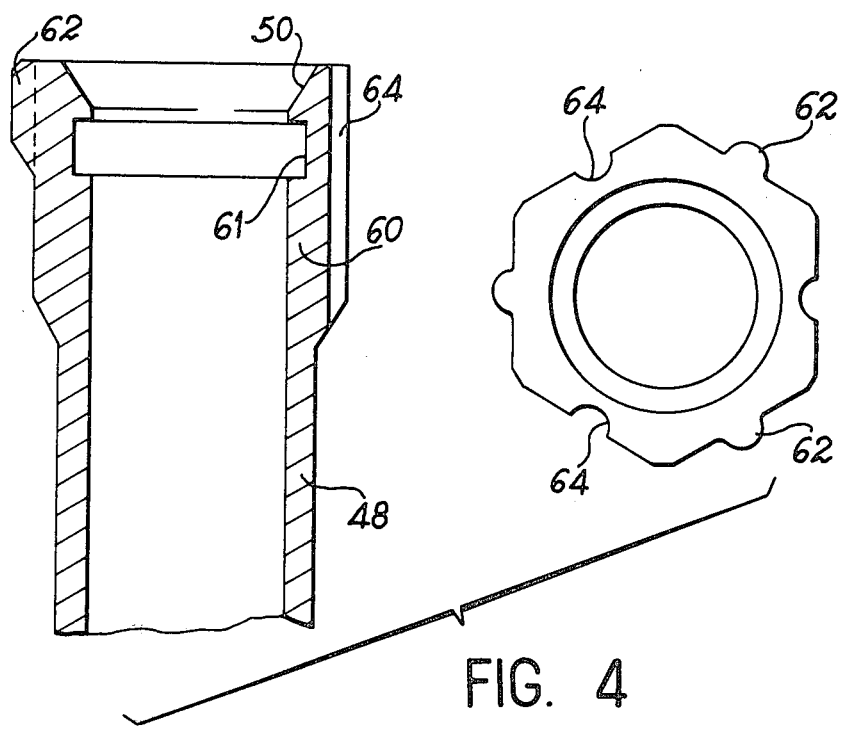
FIG. 4 a cross-sectional view along line IV—IV of FIG. 2 illustrating the ballasting of the supporting members.

The upper end 60 of the supporting member preferably has a hexagonal section. Moreover, three stubs 62 ensure the ballasting of a supporting member by the adjacent assemblies. As shown in FIG. 4, each supporting member has three stubs 62 and three slots 64 of corresponding dimensions arranged in alternating manner.

This arrangement is intended to facilitate the handling operations carried out on stopping the reactor. It is thus possible to unload an assembly without any danger of carrying the corresponding supporting member with it. If necessary, it is also possible to introduce or remove a supporting member, to this end the said member is provided with a gripping groove 61.

It is readily apparent from the preceding description, that there is a double hydraulic locking system in the reaction when it is functioning normally. A first hydraulic locking is ensured between the supporting member B and the shore 9 of the cross-member, due to the fact that by controlling the low pressure leakage flow f realised by labyrinth 28 and the bore in a shore 9 about the lower end of supporting member B a low pressure zone is created, which is to be compared with the high pressure between the two plates of the cross-member and above labyrinth 28. A second hydraulic locking is ensured between the actual fuel assembly C and the supporting member B, this being effected by labyrinth 54 located at the lower end of fuel assembly leg $C_1$ and the bore of tube 34. Labyrinth 54 also creates a low pressure zone below leg $C_1$ and thus opposes the high presure zone above labyrinth 54.

Moreover, labyrinths 30 and 56 serve to create a controlled pressure and controlled flow leak, thus protecting the surfaces which are in contact with the spherical/conical bearing surfaces 35-33 and 52-50 against risks of cavitation. Furthermore, this controlled leak is beneficial, because it produces a radial outflow ensuring the cooling of the structures placed on the core periphery.

It is readily apparent from the preceding description that the invention differs significantly from the prior art methods of maintaining and regulating the cooling liquid flow rate. Thus, the flow rate regulating function is made independent of the actual assembly, because the supporting member B fulfils both a maintaining function compared with the cross-member and the actual flow regulating function. It follows that assembly leg $C_1$ has a greatly reduced length, so that its weight is greatly reduced compared with the known solution. Moreover, it is apparent that in the conventional methods, when the assembly or more specifically its fertile or fissile part was depleted, it was necessary to unload the assembly, whose leg formed an integral part thereof, making the flow regulating means contained therein not reusable. However, according to the present invention, when the assembly or more specifically its fertile or fissile part is depleted, the supporting member remains in place in the cross-member and can be reduced with a new assembly.

The invention therefore makes it possible to standardise the assemblies positioned within the same given enrichment zone, whereby the latter can be fissile or fertile. It is then possible for assembly rearrangements to be carried out within said zone without it being necessary to modify the regulation of the coolant flow rate supplying the assemblies in question.

Figure 1:
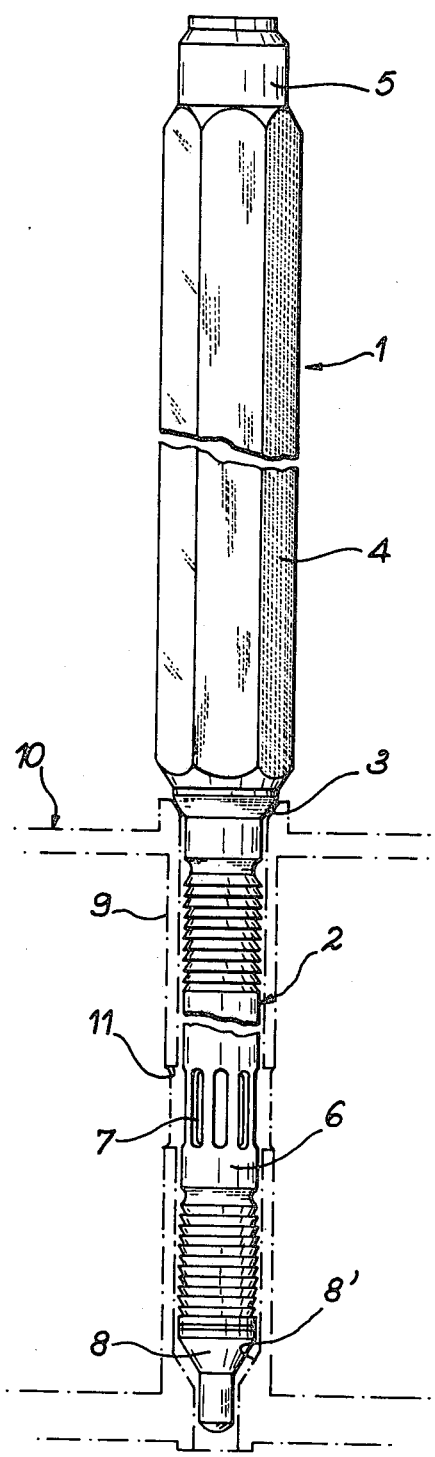
FIG. 1, which has already been described, an elevation of a prior art assembly.

Moreover, and as is very explicitly explained in French Pat. No. 75 20819, each lower plug of the assembly leg (reference 8 in FIG. 1) has a special male shape, cooperating with a corresponding female shape of the lower end of the shore (reference 8′ in FIG. 1), this having the effect of preventing any positioning error during the fitting of the assemblies.

According to the invention, the same arrangement 65 in FIG. 2 is encountered between the base 36 of tube 34 and the lower plug $C_2$ of assembly leg $C_1$. However, in the case of the prior art, the number of assemblies of different types was very large, because this number had to take account of the various sodium flow rate regulating members forming an integral part of the assembly. It was therefore necessary to have a large number of special shapes for these positioning members, making machining more complex and consequently increasing the height of this specific part.

As a result of the arrangements according to the invention and more particularly due to the fact that the flow regulating members are no longer in the assembly, the number of different shapes is greatly reduced.

Moreover, the supporting members fulfil a triple protective shield function because they ensure the neutron protection of the cross-member by reducing damage due to irradiation, the cross-member generally constituting a fixed and non-dismantleable structure, the mechanical protection of the cross-member in the case of assemblies accidentally dropping and a pre-recovery of molten fuel in the case of a hypothetical accident of the fuel melting.

It is also pointed out that, although in normal utilisation, the supporting member remains in place in the cross-member during the loading and unloading operations of the fuel assemblies, said member is detachable with respect to the cross-member. Thus, if a fault occurs on the supporting members it is easy to extract them from the vessel, because there is no mechanical connection between said members and the cross-member.

The invention is not limited to the embodiments described and represented hereinbefore and various modifications can be made thereto without passing beyond the scope of the invention.

Thus, in all cases where the coolant flow rate and the assembly weight are such that the coolant does not exert a thrust on the assembly which tends to raise the latter, it is possible to replace the radial supply of the assembly by an axial supply thereof, which is easier to realise. Thus, the assembly leg can be constituted by an open ended tube. In this case, the upper part of the supporting member is also simplified, because the coaxial tube 34 and the associated spacers can be eliminated.

Furthermore, it is obvious that the labyrinths can be replaced by any equivalent means having the effect of creating a pressure drop and for example it is possible to use segments.

What is claimed is:

1. In a liquid metal cooled nuclear reactor having a core formed by a plurality of assemblies and a cross-member supporting the core provided with vertical hollow shores, said cross-member forming a reservoir for supplying said assemblies with high pressure liquid metal, each of the said assemblies having a leg comprising a generally cylindrical hollow body sealed at its upper end by a plug, means for holding and supplying each of the said assemblies comprising a hollow supporting member having a generally cylindrical shape, said hollow supporting member having towards its upper end an inner coaxial tube sealed by a base and which serves to receive with a clearance the lower end of the assembly leg, the latter being provided above said inner coaxial tube with at least one liquid metal supply opening and below said supply opening with means cooperating with said tube in order to create a pressure drop for liquid metal leakage flow, said hollow supporting member further having a lower part which is sealed at its lower end by a plug and which can be introduced with clearance into one of said shores, said lower part of the hollow supporting member being provided with a bearing surface by which said member rests on the upper end of said shore and with openings which coincide with openings made in the shore, means for regulating the liquid metal flow rate being provided in said lower part of the hollow supporting member above said openings in the shore and below said supply openings in the assembly leg, said lower part having on its outer face means for creating a pressure drop disposed below its supply openings, said last named means being able to create with the corresponding part of the shore a pressure drop for a liquid metal leakage flow directed towards the bottom of the cross-member.

2. A device according to claim 1, wherein said tube is fixed to the upper part of the supporting member by spacers located below said means provided on said assembly leg, and wherein at least one of said spacers is provided with an opening directed to the outside of the supporting member.

3. A device according to claim 1, wherein the supporting member has above its supply openings a labyrinth able to cooperate with the corresponding part of the shore to create a pressure drop for a liquid metal leakage flow directed towards the outside of the said supporting member.

4. A device according to claim 1, wherein the assembly leg has above its supply openings a labyrinth cooperating with the corresponding part of the supporting member to create a pressure drop for a liquid metal leakage flow directed towards the outside of said assembly leg.

5. A device according to claim 1, wherein the upper part of the supporting member is provided with a portion having an external hexagonal cross-section, each face of which is provided with a stub or slot arranged in alternating manner, thereby to provide three stubs alternating with three slots.

6. A device according to claim 1, wherein the assembly leg is sealed at its lower end by a plug which has a male or female part provided on the base of the coaxial tube.

* * * * *